Figures 1, 2, 3:
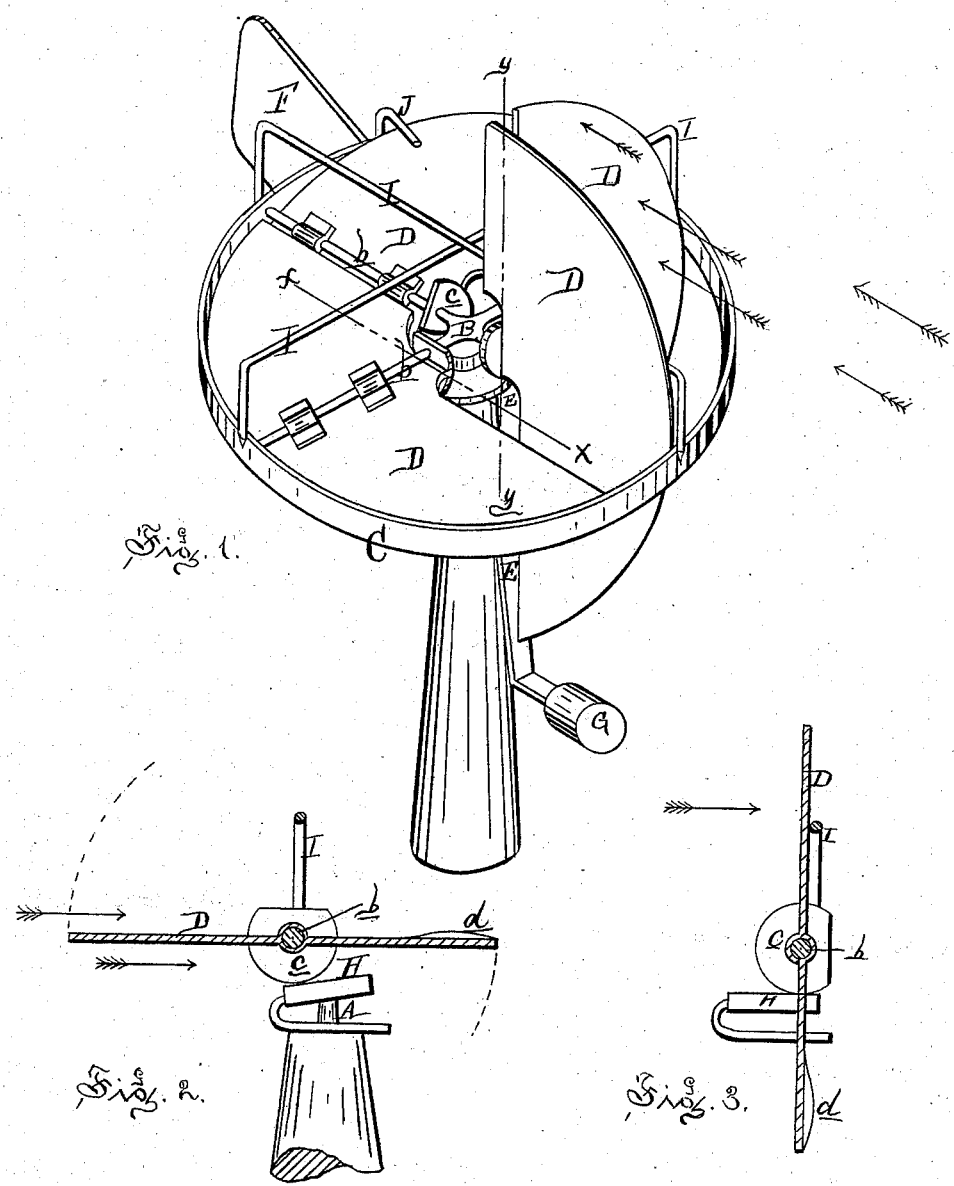

F. FORSTER.
Wind-Mill.

No. 205,373.  Patented June 25, 1878.

UNITED STATES PATENT OFFICE.

FRANK FORSTER, OF SPRINGWELLS, MICHIGAN.

IMPROVEMENT IN WINDMILLS.

Specification forming part of Letters Patent No. 205,373, dated June 25, 1878; application filed December 31, 1877.

*To all whom it may concern:*

Be it known that I, FRANK FORSTER, of Springwells, in the county of Wayne and State of Michigan, have invented a new and useful Improvement in Windmills; and I do declare that the following is a true and accurate description thereof, reference being had to the accompanying drawings, and to the letters of reference marked thereon, and being a part of this specification.

The nature of this invention relates to an improvement in windmills, usually known or called "horizontal mills;" and it consists in the peculiar construction of the wind-wheel and arrangement of the various parts, all as more fully hereinafter set forth.

Figure 1 is a perspective view of my improved windmill. Fig. 2 is a vertical section at $x\ x$, showing one vane before the wind takes it. Fig. 3 is a vertical section at $y\ y$, showing the vane after wind has taken it, and also showing mechanism below the vane for turning it into the wind.

In the drawing, A represents a shaft, properly stepped in bearings in any suitable manner. Upon the upper end of this shaft A is rigidly secured a hub, B, which is provided with the radial arms $b$, to the outer ends of which is secured the band C. D are the sails or vanes, semicircular in form, which are loosely sleeved upon the arms $b$, as shown. E is a stirrup, loosely sleeved upon the shaft A, below the hub B, and carries upon one end a tail-vane, F, and upon the other a counter-weight, G. Rising from the top of this stirrup is a spring cam-plate, H, upon which, as the wheel revolves, the cams $c$, which are secured to the inner edges of the sails, as shown, partially rotate, and cause the sails to assume a vertical position. I are stay-rods, rising from the band C, and extend across the top of the wheel directly over the arms $b$, against which rods the sails rest as they are brought into their vertical position, and which also form stops to prevent the action of the wind against the sails from throwing them beyond their vertical position. In order to assist in the raising of the sails I secure a counter-weight, $d$, to the lower corner of each. J is a trip-arm attached to the tail-vane, against which the sails, after passing out of the wind, impinge, and are thrown down into a horizontal position until, in the rotation of the wheel, they are again thrown or brought into the wind by means of the cam and cam-plate, as hereinbefore described. The sails are prevented from being thrown down through the wheel in assuming a horizontal position by inwardly-projecting stops (not shown) on the the band C.

For convenience I show my device as mounted upon a solid standard; but it should be so mounted upon a suitable structure that convenient means could be attached to the shaft for transmitting power to other mechanism, either vertically or horizontally, as circumstances might require.

If desired, a suitable governor may be attached to the shaft, which shall regulate, through proper connections, the speed of the wheel.

I have found upon trial that the wheel proper, when placed vertically in a stream of water, can be used to advantage as a current water-wheel; and while I show and describe it as applied for use as a wind-wheel, I do not wish to confine myself to such application.

What I claim as my invention is—

1. In a wind or water wheel, the hub B, provided with radial arms $b$ and sails D, in combination with the band C, stay-rods I, and shaft A, substantially as set forth.

2. In combination with a wheel constructed substantially as hereinbefore described, the cams $c$ and the spring cam-plate H, arranged to operate as and for the purposes set forth.

FRANK FORSTER.

Witnesses:
   H. S. SPRAGUE,
   CHAS. J. HUNT.